United States Patent [19]

Hill et al.

[11] 3,964,591

[45] June 22, 1976

[54] FONT SELECTION SYSTEM

[75] Inventors: James David Hill; Gene Austin Isbell; Thomas Hampton Williams, all of Lexington, Ky.

[73] Assignee: International Business Machines Corporation, Armonk, N.Y.

[22] Filed: June 10, 1975

[21] Appl. No.: 585,555

[52] U.S. Cl. .............................. 197/1 R; 197/19; 340/146.3 FT; 340/173 SP; 346/75
[51] Int. Cl.[2] ..................... B41J 5/30; G01D 15/10; G06K 9/00
[58] Field of Search ............... 101/426; 197/1 R, 19; 346/1 R, 75; 340/146.3 A, 146.3 FT, 146.3 MA, 173 SP, 174 SP, 174 AB, 173 RC

[56] References Cited
UNITED STATES PATENTS

| | | | |
|---|---|---|---|
| 3,174,427 | 3/1965 | Taylor | 197/1 R X |
| 3,560,927 | 2/1971 | Rabinow et al. | 340/146.3 MA |
| 3,611,437 | 10/1971 | Varadi et al. | 340/173 SP |
| 3,634,822 | 1/1972 | Chow | 340/146.3 FT |
| 3,678,476 | 7/1972 | Ebertin | 340/173 SP |
| 3,769,631 | 10/1973 | Hill et al. | 346/75 |
| 3,803,628 | 4/1974 | Van Brimer et al. | 346/1 |
| 3,810,095 | 5/1974 | Bibl | 340/146.3 A |
| 3,812,466 | 5/1974 | Rich | 197/1 R X |
| 3,813,676 | 5/1974 | Wolfe | 346/75 |
| 3,893,558 | 7/1975 | Fulton et al. | 197/1 R |

OTHER PUBLICATIONS

IBM Technical Discl. Bulletin, "Composing Systems which Incorporate Font Changing," vol. 13, No. 5, Oct. 1970, pp. 1149–1150.
IBM Technical Discl. Bulletin, "Printing Italics using a Standard Font," vol. 15, No. 9, Feb. 1973, p. 2791.
IBM Technical Discl. Bulletin, "Print Element Character Set Status Logic," vol. 16, No. 6, Nov. 1973, pp. 1937–1938.

Primary Examiner—E. H. Eickholt
Attorney, Agent, or Firm—D. Kendall Cooper

[57] ABSTRACT

A font selection system is provided that is useful in conjunction with ink jet printing apparatus. Facilities are included for storing data representative of one or more fonts or character sets and for selecting these on a font basis or a character basis during printing operations.

32 Claims, 7 Drawing Figures

U.S. Patent   June 22, 1976   Sheet 1 of 2   3,964,591
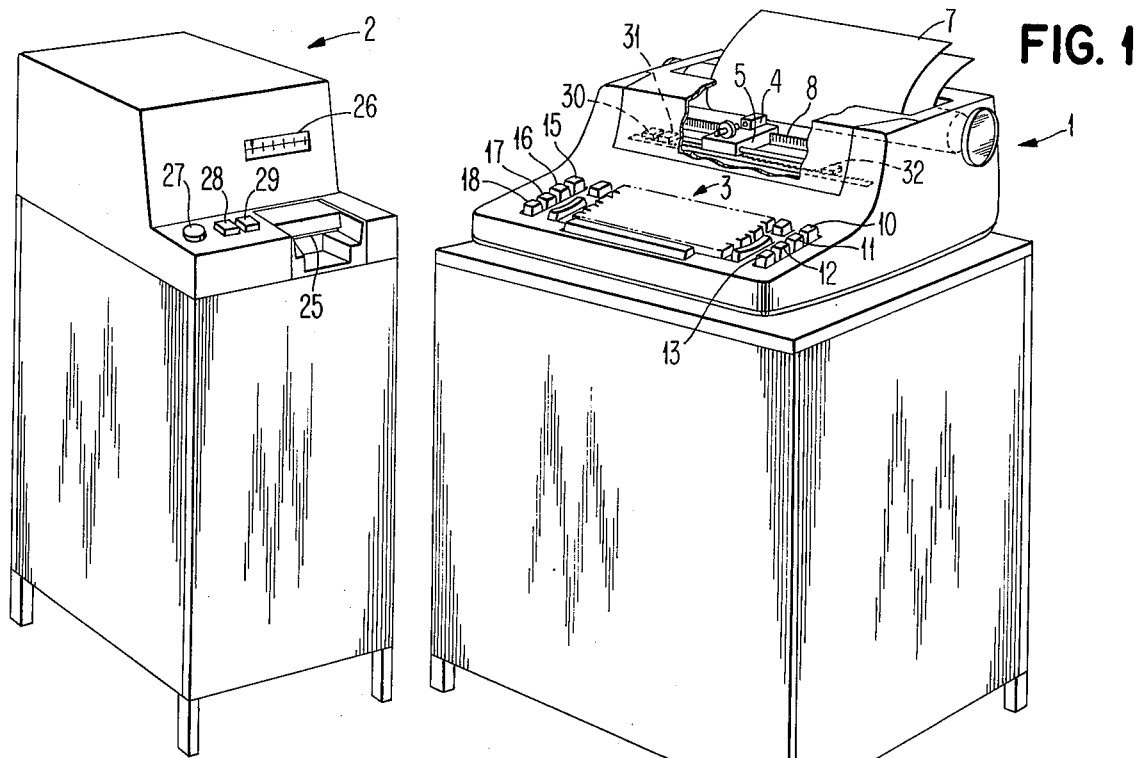
FIG. 1
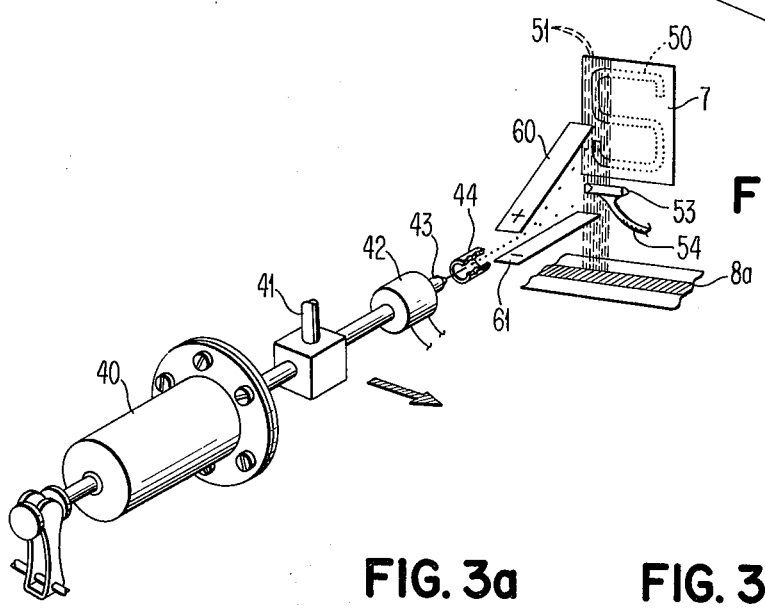
FIG. 2
FIG. 3a   FIG. 3b   FIG. 3c
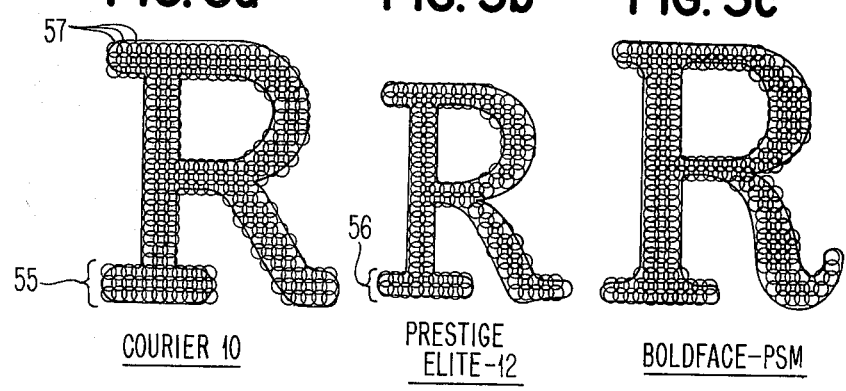
COURIER 10   PRESTIGE ELITE-12   BOLDFACE-PSM

METHOD A LOGIC
FONT INTERROGATION / CHANGE

FONT SELECTION SYSTEM

BACKGROUND OF THE INVENTION AND PRIOR ART

U.S. Pat. No. 3,831,728, entitled: "Ink Jet Printing Apparatus With Overrun of Printhead to Insure Better Visibility" and having Joe W. Woods, et al, as inventors, is of general interest.

Numerous font selection systems have been proposed heretofore but primarily in conjunction with mechanical impact printers not having facilities for storing character representations as in the system described herein. In the ink jet area, only a limited font selection capability has been contemplated. No prior art is known that is especially pertinent to the arrangements set forth herein.

SUMMARY OF THE INVENTION

The present ink jet printing system has provision for storing complete font representations comprising a plurality of individual character representations in order to control the placement of ink drops to achieve the printing of the desired font and requiring a minimum of operator attention in this regard. Facilities are incorporated in the system for automatically selecting a preferred font, such as during initial start-up routines and for changing back and forth from one font to another on a real time basis during printing, such changes being performed on a character-by-character basis, if desired. Further, provision is made for storing character representations of the respective fonts each in its own memory and when all the space is not required for a particular font, storing at least part of another font in the unused memory locations.

OBJECTS

Accordingly, a primary object of the present invention is to provide font selection capabilities in a printing system.

Still another object of the present invention is to provide for the selection of a plurality of fonts controlling drop placement in an ink jet printing system.

Still another object of the present invention is to provide a font selection system capable of operating in a highly efficient manner and with a minimum of operator attention necessary.

A still further object of the present invention is to provide for rapid font switching, that is change in font selections as on a character-by-character basis.

The foregoing and other objects, features, and advantages of the invention will be apparent form the following more particular description of the preferred embodiment of the invention as illustrated in the accompanying drawings.

DRAWINGS

In the Drawings:

FIG. 1 illustrates an ink jet printing system having a printer and an associated magnetic card recording/reproducing unit and utilizing font selection as taught herein.

FIG. 2 illustrates structures in the ink jet printer head assembly with associated grating.

FIGS. 3a, 3b and 3c illustrate three typical characters from as many type fonts showing drop placement requirements.

DETAILED DESCRIPTION

System

Figure 4:
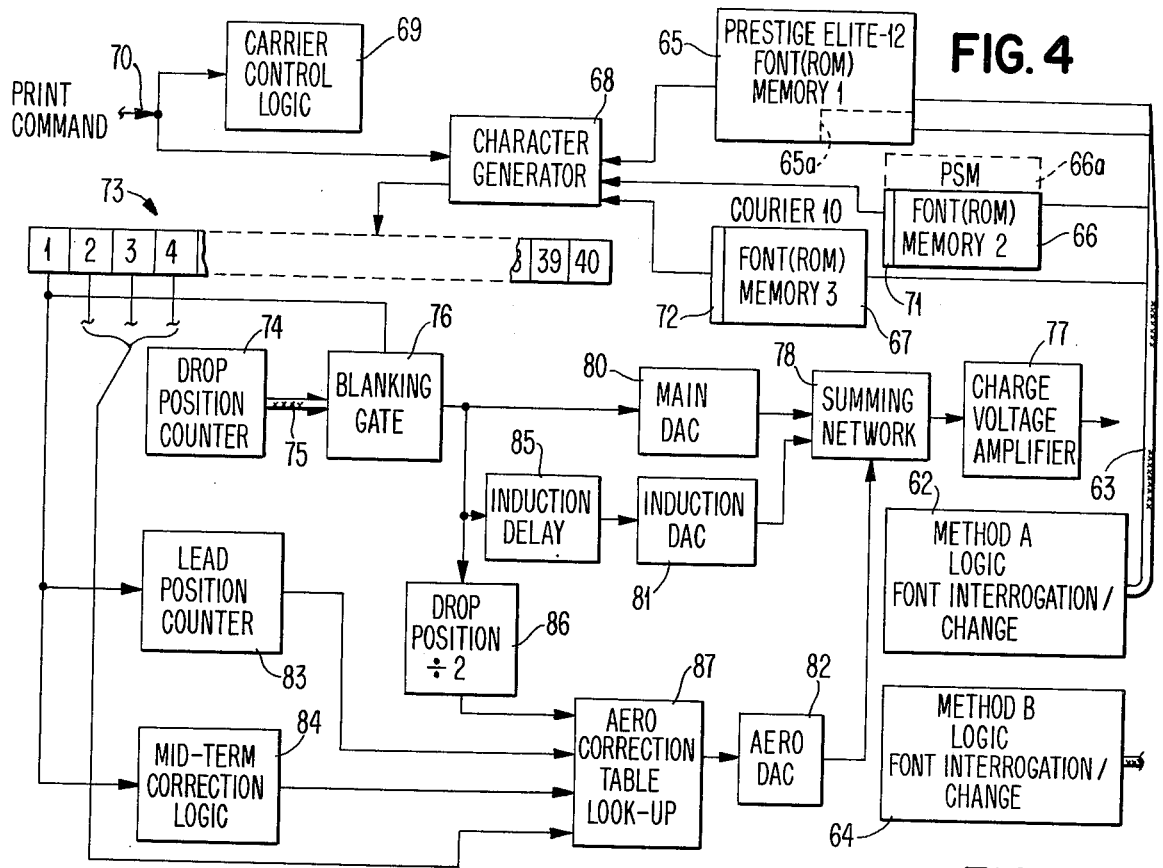
FIG. 4 is an intermediate level character generation and ink drop charging network.

FIG. 1 illustrates an ink jet printing system incorporating a printer 1 with an associated magnetic card recording/reproducing unit 2. Card unit 2 is shown for convenience only and other kinds of storage units, recording/reproducing units, and the like, may be used in the system. Printer 1 has the usual keyboard 2 for entry of characters into the system and control of functions. Printer 1 incorporates an ink jet head assembly 4 arranged on a carrier 5 for travelling movement from left to right (and conversely) adjacent a document 7 to be printed. Assembly 4 has an ink drop nozzle and an associated grating 8 for determination of horizontal position during printer operations. Printer 1 may be provided with various control buttons 10, 11, 12 and 13 for automatic, line, word, and character printing, respectively. Other keybuttons 15–18 concern mode selection, that is, record, playback, adjust, and skip, respectively. Printer 1 incorporates a left margin reed switch 30, a drop carrier return reed switch 31 and a right margin reed switch 32.

Magnetic card unit 2 has a load slot 25 and a track indicator 26. Also provided on unit 2 is a card eject button 27, a track stepdown button 28 and a track stepup button 29 for relocating the scanning transducer (not shown) with respect to the various tracks on the card.

Referring to FIG. 2, various structures incorporated in head assembly 4 are illustrated. This includes a pump 40 for directing ink from an ink supply conduit 41 on demand as a crystal 42 is energized, that is pulsed at high frequencies. The rate of impulsing crystal 42 may be in the range of 100 kiloHertz, for example. Ink drops are emitted from nozzle 43 and pass through a charge electrode 44 for variable charging in accordance with the output of a charge amplifier to deflect the drops vertically in each column to insure proper placement of each drop to be printed in any given character. As illustrated the capital letter "S" designated 50 comprises a number of vertical columns 51. The printing is such that a sequence of vertical columns, each comprising a plurality of drops, such as 40 in number, is propelled from nozzle 43 toward document 7 for the printing of the character involved. If drops are not required for printing, they are directed to a gutter 53 for passage by means of a conduit 54 back to the ink supply, customarily. A pair of deflection plates 60 and 61 is positioned in the path of travel of the drops leaving the charge electrode 44. A constant high potential is applied across plates 60 and 61 and this in cooperation with the variable charge on the individual drops determines the amount of the deflection as the drops are directed toward document 7. Grating 8a in this instance is shown as being positioned horizontally rather than vertically as in FIG. 1, but the positioning is immaterial.

INTRODUCTION - FONT SWITCHING

FIGS. 3a, 3b, and 3c illustrate some commonly used type fonts, with the Capital "R" shown in each case. FIG. 3a shows the "R" for the Courier 10, that is, 10 pitch type font. FIG. 3b illustrates a commonly used type style, the Prestige Elite in 12 pitch. FIG. 3c represents still another type font that is available, namely, the Bold Face in a PSM, that is, Proportional Spacing Machine. The present system is capable of handling up to eight font styles with automatic selection of the fonts, as required. Typically, however a customer would have in the range of three, possibly four, type fonts in any particular system. Thus, the type fonts in FIGS. 3a–3c represent a typical customer's requirements. In setting up the system, it may be preferable to "hardwire" the machine for a particular font and for the present system, it is assumed that the Prestige Elite — 12 of FIG. 3b is font number one. It is desirable for system control purposes to designate the Read Only Memory (ROM) 1 for storing the number one font, Prestige Elite - 12.

The data to be printed is provided by card unit 2 through an interface. Also, commands and status signals pass through the interface.

The characters are formed by charging and deflecting drops to the desired location in a 40 drop high raster or scan. For a 10 pitch character, 24 such scans are used to produce a 40 × 24 drop character box. The 24 scans are produced by the horizontal motion of the carrier 5. The 40 drop scans represent a vertical distance of 1/6 inch. Thus, the resolution in both the horizontal and vertical direction is 240 drops/inch. For 12 pitch characters, the character box is 20 scans wide, while the character box for PSM characters varies from 12 to 28 scans.

The fonts or character sets are stored in read-only memories and contain the data to tell the logic which drops in the character box to charge. In a typical case, a total of five fonts can be installed in a printer and the system can select any of the fonts on a character-by-character basis. Usually, a font contains just the domestic character set or both the domestic and World Trade Latin character sets. The World Trade Latin character set includes, as single characters, characters that are normally printed using a dead key feature.

In a multi-font ink jet machine where the fonts are stored in prewired hardware such as Read Only Storage (ROS), in accordance with the present invention, the operator does not have to change fonts by removing and inserting electronic small cards, or changing panel switches, but font changes are automated.

Electronic font switching serves two purposes:

1. It allows the machine to have multiple font capability without the necessity of having the operator handle the hardware.

2. It allows characters from one font to be stored in another font storage area, thus saving Read Only Storage (ROS) modules.

The system described has multiple fonts and means are provided to relate the operator's request for a particular font to its location in the machine. Ordinarily, there are more fonts available to the customers than there are memory locations to put them in any one machine. Therefore a fixed relationship is not possible. Strapping or changing the software is undesirable from a cost standpoint and it makes each system unique which is also undesirable.

An interrogation and font change scheme is proposed whereby the system is told what font is in each memory location in the machine and the system controls the printer to electronically switch to any font. This eliminates the need for a fixed relationship between fonts and socket locations.

METHOD A

The system determines and maintains the status of fonts that are in each location and can issue a font change command which will cause the logic to setup latches so that succeeding characters will be printed out of the new font. The use of setup latches ahead of the actual control latches serves a dual purpose. The font change command can be issued while the previous character is still being printed. This insures that in burst mode printing the printer does not have to stop while a change is being made. Thus the font change can be done 'on the fly.' During overflow, the setup latches also remember what the main font is when a temporary change has been made to the extra font storage in Font 1.

METHOD B

During Power On Reset (POR) the logic is setup to select Font 1. When the system needs to print from another font it signals the logic via a control line and data bus that it wants to know what font is in location 2. This causes the logic to do the following:

1. Change the latches which control the font select lines so that Font 2 is selected.

2. Initiate a read memory cycle for a fixed address (512).

3. Send back on the data bus 8 bits of data which define the font, including its pitch.

This sequence is repeated until all locations have been interrogated or the desired font has been found. The select latches will keep the last font interrogated as the active font until a font change or Power On Reset occurs.

The second purpose is to allow part of one font to be stored in another font memory. In the case of ink jet printer fonts, for example that are stored in 32K ROS's, they require different amounts of storage, some more than 32K, others less than 32K. Typically a base font provided with each machine requires less than 32K so the excess from other fonts can be stored in this known location (Font 1). If the system is using a font that has overflowed, when a character is needed which was in the overflow, a bit is read from the first memory cycle which indicates this character is located in Font 1. This causes the font select latches to change to Font 1 (at the appropriate time) in order to read the character data. These latches are reset after each character has been completed and the setup latches are read each time a character is started. Thus the system has the ability to go to another font, obtain data and get back to the original font for the next character.

MNEMONICS

CSL* — Not chip select latch
C∅ through C7 — 8 bit code lines
C∅ through C7* — "Not" condition of code lines
EOCSA — End of character, not yet in first memory cycle
F1S through F8S — Font 1 selected . . . Font 8 selected
FC∅, FC1, FC2 — Font change latches, intermediate storage for next font required
GOF1 — Go to font 1
IJCC — Ink Jet Control Command (*=Not)
Inverter — Logic circuit for inverting signals
M1 through M8 — Data return lines from memory.

Nand — Logical And with Negative output when all inputs are conditioned

Nor — Logical Or with Negative output when any one or more inputs are conditioned NFC$\emptyset$, NFC1, NFC2 — New font latches that produce F1S - F8S NFG — New Font Gated SAINT — Interrogate SA (first) Memory Cycle SBT1 — Time T1, Second Memory Cycle SCD — Memory Timing Latch SE — Fifth Memory Cycle SFNT1 — Set Font 1

LOGIC DESCRIPTION AND TERMS

A. Change to Font 2;

IJCC*, C7*, C6, C5, C2, C1= $\emptyset$; C$\emptyset$= 1;

This causes NFG = 1; NFG is a gating term on the set circuits for 3 latches (FC$\emptyset$, FC1, FC2); NFG* is the gating term on the Reset. C$\emptyset$, C1, C2 are the data terms on the latches.

The latches are now set FC$\emptyset$=1; FC1=$\emptyset$; FC2=$\emptyset$; when the next print character command is received, the signal SAINT goes to a 1; this gates FC$\emptyset$, FC1, FC2 into latches NFC$\emptyset$, NFC1, NFC2 respectively. These latter latches are the inputs (with the timing term CSL*) for the individual font select decodes F1S → F8S. F2S will now be pulsed for each memory cycle until 'End of character' has been read. This causes EOCSA which resets NFC$\emptyset$ → NFC2, the Font 1 condition. They are now ready to be set to any state when the next print command occurs.

B. Interrogate Font 2

Interface lines are the same except C6=1;

The FC & NFG perform the same function; a read memory cycle is initiated and the 8 bit byte is fed back to the interface.

C. Read from Font 1;

If the font being used is not font 1 and M8=1 occurs during the first read from memory, the GOF1 latch is set. During SCD time (after second memory cycle) the NFC latches are reset by SFNT1, thus the remaining bytes are read from Font 1 until 'End of Character'.

Font Memories and Character Generation

FIG. 4 is a block diagram of various portions of the control logic for the system illustrated in FIG. 1. The font memories 65, 66 and 67 together with character generator 68 are of primary interest in the present case but other blocks in FIG. 4 are of interest, as well.

Character generator 68 and carrier control logic 69 receive Print Command signals on line 70 during operation of the system to effect printing of characters. As mentioned, font memory 65 is hardwired to store a preselected character font which in this case is Prestige Elite 12. Font memories 2 and 3, designated 66 and 67, respectively, are assigned to store the Bold Face PSM and Courier 10 font, respectively. These memories are pluggable chips that are inserted into receptacles 71 and 72, respectively. Normally, certain fonts such as Prestige Elite 12 require less space in memory and unused space such as memory portion 65a becomes available for storing font information for other fonts. This is illustrated with font memory 2 designated 66 where the PSM font requires more storage than is ordinarily provided on a single chip shown as an overflow section 66a. One of the features of the present invention is that when a font requires additional storage such as the PSM font portion 66a this is accommodated in the unused portion 65a of memory 65. The Courier 10 font is assumed to utilize practically all of the memory locations in memory 67.

The Read Only Memories (ROM) actually store a run length coding of the characters in each font plus other variables such as line weight, that is, whether two drops or three drops may be required for portions of the characters, the height of the characters, scan repeat operations involving the use of multiple scans that are identical, etc. To illustrate, in FIG. 3a portion 55 of the "R" in Courier 10 style requires three drops weight while in FIG. 3b, portion 56 of the "R" in Prestige Elite — 12 style only requires two drops line weight.

Also, it is noted that columns 57 of the "R" in FIG. 3a are repeatable having the same pattern in both the top and bottom override scan areas. Repeatable scans are encountered elsewhere in these characters as well as in other characters in the various fonts.

Figure 5:
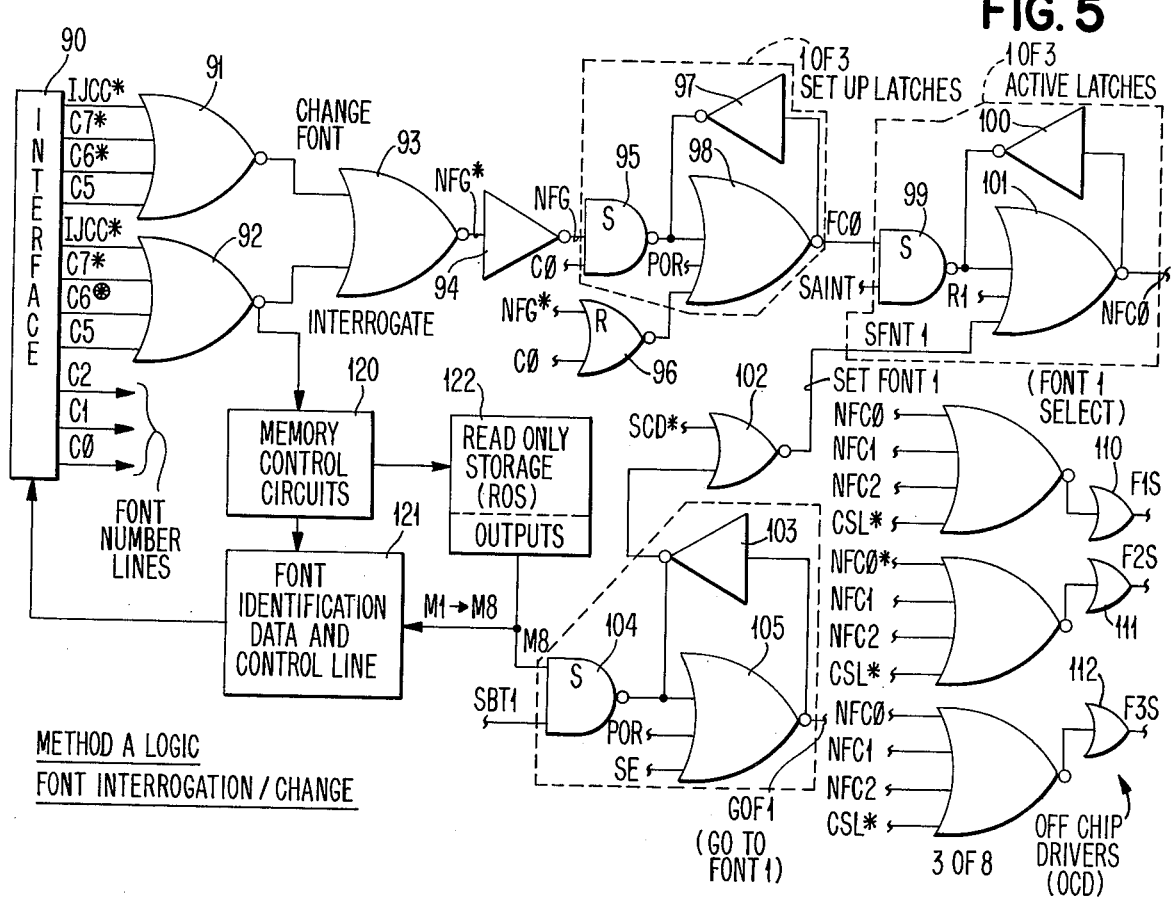
FIG. 5 is a detailed diagram of the font selection circuitry in accordance with the present invention.

Selection of a particular font memory is made under control of the detailed circuits shown in FIG. 5, to be discussed shortly. Character generator 68 receives character information from whichever font has been selected and decompresses the information, converting it to a serial bit stream which is applied to the shift register 73, having bit positions 1–40 corresponding to the bit locations in each vertical scan during printing.

Some of the other blocks of interest in FIG. 4 include the Drop Position Counter 74 which provides a 6 bit Code Configuration on bus 75 to blanking gate 76 indicative of the drop locations of shift register 73. Blanking gate 76 directs the system to send the drop to the gutter 53, FIG. 2. Each drop is charged with a variable charge from charge voltage amplifier 77 derived from summing network 78 having inputs from several digital to analog converter circuits (DAC) 80, 81 and 82.

These circuits in conjunction with blocks 83–87 provide a correction function for compensating for induction effects due to inter-drop charges and "wake" effects created as the drops move from the nozzle to the document being printed.

Detailed Operation and Circuit Description

The interrogation and font change scheme was generally outlined in the Introduction-Font Switching section above. Reference is now made to FIG. 5 for a more detailed description of the font change operation and the circuit operation involved.

When power is initially brought up on the system, a signal call Power On Reset (POR) is sent to the logic. It resets the Set up latches FC$\emptyset$, FC1 and FC2. Only latch FC$\emptyset$ is shown in FIG. 5 as comprising blocks 95, 97, and 98. Additionally the Power On Reset signal resets the Go to Font One latch comprising blocks 103–105. This has now conditioned the logic to print out of Font 1. In the normal system operation, the next event to happen will be the interrogation of the fonts. In the present system as previously indicated, and according to Method A, Font 1 is "hardwired" while the remaining fonts are pluggable units. Therefore, it is necessary that the system go through an interrogation cycle in order to determine what fonts have been plugged into the respective memory receptacles. This is accomplished by activating the Nor gate 92. The inputs necessary to activate Nor gate 92 are shown on the input side to that circuit. Nor gate 92 brings up the signal called Interrogate which forces Nor gate 93 low and generates the signal New Font gated from circuit 94. This circuit, anded with the font number lines then changes the Set up latches, (only FC0 being shown) to the appropriate font number that it desires to interrogate. The output of latch C0 is applied to the No. 1 Set up latch, C1 to the No. 2 Set up latch and C3 to the No. 3 Set up latch. As an example, the interrogation sequence may start with font 8, in other words C0, C1 and C2 will be a logical 1 level and will set all three of the Set up latches. This initiates the memory cycle and causes signal SAINT to become true which gates the three Active latches only one of which is shown, Active latch No. 1 is composed of circuits 99, 100 and 101. With these latches set, the terms are now available for driving the Off Chip Driver (OCD) circuits 110, 111, and 112, when the signal Not Chip Select (CSL*) becomes true. When the memory cycle has been completed, the ROM will place on the M1 –M8 lines, the code representative of the particular font that is stored in this location. This information is fed to the Font Identification Data and Control line circuit 121. This is then gated back into the interface 90. From interface 90 the information is fed back to the central processor. This 8 bit byte of information contains information which not only gives the style of the font but also the pitch value for that particular font. This sequence is repeated for interrogating font 7, font 6, etc. until font 1 is again reached at which time the interrogate sequence has been completed. This leaves the logic set with Font 1 selected so that if no further changes are made, any characters called for will be printed from Font 1. The foregoing describes the sequence that is used to implement Method A of interrogation.

Method B

If desired, the interrogation of the font memories can be conducted on a real time basis, each time it is desired to change the font that is in use. In this case, any time a new font is required, the system interrogates the various font memories to find out what is stored and select the required font. This contrasts with Method A just described in detail where the system interrogates the font memories initially and stores information that informs it what font each memory contains as well as the pitch required for that font. So, with Method A the system only needs to interrogate the font memories once at the outset of operation and need not interrogate repeatedly as with Method B. In using Method B during the interrogate sequence when the appropriate font has been found, the latches remain set up to select that font so there is no need to issue a Font Change command. In Method A, the system looks up what font location the required font is in and issues a control command from interface 90 that activates block 91 which brings up the Change Font command. This activates Nor gate 93 and Inverter 94 and the data bus C0, C1, C2 is read to set up the latches to select the appropriate font. The printer will now print out of the selected font until it is changed to another font.

Overflow Operation

The logic also functions to handle memory overflow conditions. The system is assumed to be operating out of Font 2, memory 66, FIG. 4, which previously discussed is the overflow font. When a particular character is called for that is in the overflow condition, during the first memory cycle the data bit M8 from memory will be true, that is at the logical 1 level. This will activate Nand gate number 104 which causes the latch comprising circuits 103, 104 and 105 to be activated. This output is Anded with the memory timing signal SCD and activates circuit 102 which brings up the signal SFNT1. This drives the active latches NFC0, NFC1, NFC2 to the Font 1 selected condition. The active latches will contain the Font 1 select code until the end of character has been read. When the next character is called for, it will be printed out of Font 2 unless the M8 bit of memory is true again on the first cycle.

While the invention has been particularly shown and described with reference to several embodiments, it will be understood by those skilled in the art that various changes in form and detail may be made without departing from the spirit and scope of the invention.

What is claimed is:

1. A printing system comprising:
   means to print a multiplicity of type fonts;
   individual font storage means for determining printing characteristics of each of said fonts;
   a plurality of receptacle means in said printing system for insertion and interconnection of said individual font storage means to said system, said receptacle means accommodating any of said font storage means on a randomly insertable basis; and
   interrogation means for determining the font storage means inserted in a specific receptacle means.

2. The apparatus of claim 1 further comprising:
   a particular font storage means for determining printing characteristics of a particular font, said particular font storage means being hard-wired in said printing system.

3. An ink jet printer, comprising:
   means to print by ink drops a multiplicity of type fonts;
   individual font storage means for determining printing characteristics of each of said fonts;
   a plurality of receptacle means in said printer for insertion and interconnection of said individual font storage means to said printer, said receptacle means accommodating any of said font storage means on a randomly insertable basis; and
   interrogation means for determining the font storage means inserted in a specific receptacle means.

4. A printing system, comprising:
   printing means to print a multiplicity of type fonts;
   individual font storage means for determining printing characteristics of each of said fonts, at least one of said font storage means being accommodated in said system on a randomly insertable basis;
   interrogation means for determining the font storage means accommodated in said system; and
   printing control means for selecting one of said font storage means to control printing operations.

5. The apparatus of claim 4 wherein:
   said printing control means is operable to select on a real time basis alternative ones of said font storage means to control printing during printing operations.

6. The apparatus of claim 4 wherein said printing system is operable to print characters of information and wherein:
   said printing control means is operable through said interrogation means to select alternate ones of said font storage means on a character by character real time basis during printing operations.

7. The apparatus of claim 4 further comprising:
   status means for storing representations indicative of the font storage means stored in each receptacle; and wherein said interrogation means includes means operable during a start-up interval to determine the font storage means accommodated in each receptacle means; and wherein said printing control means includes means responsive to said representations in said status means for selecting font storage means during printing.

8. The apparatus of claim 4 further comprising:
preference means in said system for selecting a predetermined font storage means as the preferred font storage means for printing.

9. The apparatus of claim 4 further comprising:
font change means operable to issue font change command signals during printing operations; and
font change control means controlled by said command signals for determining font storage means selected during printing.

10. The apparatus of claim 9 further comprising:
setup means interconnected with said font storage means and operable to store font change command representations responsive to said font change command signals in order to enable issuance and storage of font change commands prior to actual need during printing.

11. The apparatus of claim 10 where a predetermined font storage means has facilities for storing excess font information for another selected font storage means and wherein:
said set up means includes means operable during an overflow mode to store a representation indicative of the selected font storage means in use when a transfer is made to the excess facilities of said predetermined font storage means.

12. The apparatus of claim 4 further comprising:
logic means in said interrogation means for sequencing through a plurality of said font storage means in order to select a desired one of said font storage means.

13. The apparatus of claim 4 wherein said font storage means have a substantially uniform storage capacity and wherein:
a first one of said first storage means has an excess storage area over and above that required to store its respective font information, while a second one of said font storage means requires additional storage;
means operable to store the additional font information of said second font storage means in the excess storage area of said first font storage means; and
overflow means operable during selection of said second font storage means to transfer to the excess area of said first font storage means in order to access information stored therein.

14. The apparatus of claim 13 wherein:
said overflow means is operable automatically to return from said first font storage means to said second font storage means in order to resume use of said second font storage means.

15. The apparatus of claim 13 wherein:
said overflow means is operable on a character-by-character basis to effect changes between said first and second font storage means during printing operations.

16. The apparatus of claim 4 wherein said printing system incorporate ink jet printing means operable under control of selected font storage means to effect printing of information.

17. The apparatus of claim 4 wherein:

said first storage means stores first information including variables such as data character information, character pitch, line weight information, character height, repeatable scans, and the like.

18. The apparatus of claim 17 wherein the information stored in said font storage means is maintained in a run length code form.

19. The apparatus of claim 4 further comprising:
a plurality of receptacle means in said system for insertion and interconnection of said individual font storage means to said system, said receptacle means accommodating any of said font storage means on a randomly insertable basis.

20. A font selection system comprising:
font utilization means;
individual font storage means for providing font information to said font utilization means, at least one of said font storage means being accommodated on a random basis in said system; and
interrogation means for determining the font storage means accommodated in said system.

21. The apparatus of claim 20 further comprising:
a particular font storage means for determining printing characteristics of a particular font, said particular font storage means being hard-wired in said printing system.

22. The apparatus of claim 20, further comprising:
control means for selecting one of said font storage means to provide information to said utilization device.

23. The apparatus of claim 20 wherein:
said control means is operable to select alternative ones of said font storage means on a real time basis during operations of said system.

24. The apparatus of claim 20 further comprising:
font change means operable to issue font change command signals during operations; and
font change control means for determining fonts selected during printing.

25. The apparatus of claim 20 wherein said font storage means have a substantially uniform storage capacity and wherein:
a first one of said font storage means has an excess storage area over and above that required to store its respective font information, while a second one of said font storage means requires additional storage;
means operable to store the additional font information of said second font storage means in the excess storage area of said first font storage means; and
overflow means operable during selection of said second font storage means to transfer to the excess area of said first font storage means in order to access information stored therein.

26. The apparatus of claim 25 wherein:
said overflow means is operable automatically to return from said first font storage means to said second font storage means in order to resume use of said second font storage means.

27. The apparatus of claim 20 wherein a predetermined font storage means has facilities for storing excess font information for another selected font storage means and wherein said system further comprises:
during an overflow mode to store a representation indicative of the selected font storage means in use when a transfer is made to the excess facilities of said predetermined font storage means.

28. The apparatus of claim 20 further comprising:

logic means in said interrogation means for sequencing through a plurality of said font storage means in order to select a desired one of said font storage means.

29. The apparatus of claim 20 wherein said utilization means incorporates ink jet printing means operable in response to selected font storage means to effect printing of information.

30. The apparatus of claim 20 wherein:
said font storage means stores font information including variables such as data character information, character pitch, line weight information, character height, repeatable scans, and the like.

31. The apparatus of claim 30 wherein the information stored in said font storage means is maintained in a run length code form.

32. The apparatus of claim 20 further comprising:
a plurality of receptacle means in said system for insertion and interconnection of said individual font storage means to said system said receptacle means accommodating said font storage means on a randomly insertable basis.

* * * * *